United States Patent Office 3,515,744
Patented June 2, 1970

3,515,744
SUBSTITUTED N-PHENYL CARBAMATES
Gustav Steinbrunn, Schwegenheim, Pfalz, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Dec. 9, 1966, Ser. No. 600,387
Claims priority, application Germany, Jan. 7, 1966, 1,542,817
Int. Cl. C07c 101/44, 121/78; C07d 5/16
U.S. Cl. 260—471           2 Claims

ABSTRACT OF THE DISCLOSURE

Herbicides having the following formula

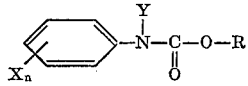

in which X, Y and R denate substituents such as halogen, lower alkyl, etc.

---

The present invention relates to new N-phenyl carbamates. In particular it relates to N-phenyl carbamates which contain further substituents on the nitrogen atom of the carbamic acid. It also relates to methods of controlling unwanted plants with the said carbamates.

It is know that methyl N-3,4-dichlorophenyl carbamate may be used as the active ingredient of a herbicide (Belgian patent specification No. 612,550.). It is also known that 2-chloro-4,6-bis-(ethylamino)-s-triazine may be used as the active ingredient of a total herbicide (U.S. patent specification No. 2,891,855). However their action is not satisfactory.

We have found that compounds having the formula

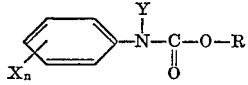

in which
X denotes halogen or a trifluoromethyl, nitro, carboxyl, hydroxyl, methoxyl, cyano, methylsulfonyl or alkyl group,
$n$ has the value 0 to 5,
R denotes an aliphatic or phenyl radical which may be substituted by halogen, hydroxyl, methoxyl, cyano or carboxyl, or a benzyl radical which may be substituted by a nitro group, or a cycloaliphatic radical or furfuryl,
Y denotes an alkyl radical which may be substituted by halogen or cyano, or a phenyl or pyridine radical or a cycloaliphatic radical or the radical —CO—R¹, in which
R¹ denotes an alkyl radical which may be substituted by halogen or phenyl, which in its turn may bear halogen as substituent, or a phenyl radical which may be substituted by halogen, or Y denotes the radical —OR², in which
R² denotes hydrogen or a phenyl radical which may be substituted by halogen or alkyl, or the radical —CO—R³, in which
R³ denotes an alkyl radical which may be substituted by halogen or a phenoxy radical, which in its turn may bear chlorine or alkyl as substituent, or a phenyl radical which may be substituted by halogen or a pyridine radical which may be substituted by halogen or the amino group, or R² denotes the radical, in which

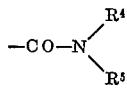

R⁴ denotes an alkyl radical or a phenyl radical which may be substituted by halogen and R⁵ denotes hydrogen or R⁵ has the same meanings as R⁴, have a good herbicidal action.

The compounds to be used according to the invention may be simply prepared by reacting phenylhydroxylamines with alkyl, buten-(1)-yl-(3), halogenated buten-(1)-yl-(3) or butyn-(1)-yl-(3) halo(chloro)-carbonates.

Since all the other compounds to be used according to this invention may be prepared by an analogous methods, the production of methyl N-hydroxy-N-3,4-dichlorophenyl-carbamate will now be described in detail.

117 parts by weight of 3,4-dichloronitrobenzene is dissolved in toluene and reduced to 3,4-dichlorophenyl-hydroxylamine. 79 parts by weight of quinoline is added to this solution under nitrogen while stirring and then 56 parts by weight of methyl chlorocarbonate is dripped in at 25° to 30° C. After the latter has been added, the reaction mixture is heated to 35° to 40° C. and kept at this temperature for four hours. Stirring is then continued for twelve hours at room temperature. The solution is acidified with hydrochloric acid, the organic layer is washed in a separating funnel and then the solvent is removed in vacuo. The residue is twice recrystallized from cyclohexane and benzene. 56 parts by weight of methyl-N-hydroxy-3,4-dichlorophenyl carbamate (melting point: 79° to 80° C.) is obtained.

The following compounds are examples of suitable agents for regulating plant growth:

isopropyl N-3,4-dichlorophenyl-N-hydroxy carbamate
butyn-(1')-yl-(3') N-3-chlorophenyl-N-hydroxy carbamate $n_D{}^{25}=1.5550$
buten-(1')-yl-(3') N-3-chlorophenyl-N-hydroxy carbamate $n_D{}^{25}=1.2305$
2'-chlorobuten-1'-yl-3' N-3-chloro-4-methylphenyl-N-hydroxy carbamate
1',1',2'-trichlorobuten-1'-yl-3' N-4-chloro-3-methylphenyl-N-hydroxy carbamate
1',2'-dibromobuten-1'-yl-3' N-3,4-dimethylphenyl-4-hydroxy carbamate
1',2'-diiodobuten-1'-yl-3' N-3,4-dimethylphenyl-N-hydroxy carbamate
1',2'-dibromobuten-1'-yl-3 N-4-bromophenyl-N-hydroxy carbamate
isopropyl N-4-chloro-3-trifluoromethylphenyl-N-hydroxy carbamate
isopropyl N-3-chloro-4-bromophenyl-N-hydroxy carbamate
methyl N-3-chloro-4-fluorophenyl-N-hydroxy carbamate
isopropyl N-phenyl-N-hydroxy carbamate M.P. 52° to 54° C.
the α,α-dichlorobutyrate of 4'-bromobutyn-2'-yl-1' N-3-chlorophenyl-N-hydroxy carbamate
the α,α-dichloropropionate of isopropyl N-hydroxy-pentachlorophenyl carbamate
the α,α,β-tribromopropionate of butyn-1'-yl-3' N-3,4-dichlorophenyl-N-hydroxy carbamate
the trichloroacetate of 2',3',3'-trichloroallyl N-2,6-dinitro-4-trifluoromethylphenyl-N-hydroxy carbamate
the iodoacetate of butenol N-2,6-dinitro-4-methyl-sulfonylphenyl-N-hydroxy carbamate
the 2,3-triiodobenzoate of m-chlorophenyl N-3-nitrophenyl-N-hydroxy carbamate
the 2-chloro-4-methylphenoxyacetate of β-hydroxyethyl N-3,4-dibromophenyl-N-hydroxy carbonate
the 2,3,6-trichlorophenoxyacetate of β-methoxyethyl N-3,4-diiodophenyl-N-hydroxy carbamate
the 4-amino-3,5,6-trichloropicolinate of β-cyanoethyl N-4-carboxyphenyl-N-hydroxy carbamate
the 2-chloro-4-methylphenoxyacetate of β-hydroxyethyl-N-3,4-dibromophenyl-N-hydroxy carbamate
the N'-dimethylcarbamate of m-nitrobenzyl N-3-cyanophenyl-N-hydroxy carbamate isopropyl N-3-chlorophenyl-N-hydroxy carbamate M.P. 48° to 50° C.
butyn-(1')-yl-(3') N-phenyl-N-hydroxy carbamate $n_D^{25}=1.3580$
4-chlorobutyn-(2')-yl-(1') N-3-chlorophenyl-N-hydroxy carbamate $n_D=1.2885$
the N'-diisopropyl carbamate of p-carboxyphenyl N-4-hydroxyphenyl-N-hydroxy carbamate
the N'-chlorophenyl carbamate of β-chloroethyl N-2,3,6-trichlorophenyl-N-hydroxy carbamate
m-methoxyphenyl N-3,4-difluorophenyl-N-cyano carbamate
cyclohexyl N-3,4-dimethylphenyl-N-β-cyanoethyl carbamate
furfuryl N-3-methylphenyl-N-β-bromoethyl carbamate
isobutyl N-3-bromo-4-methylphenyl-N-methoxy carbamate
tert.-butyl N-4-chloro-3-methylphenyl-N-2,4-dichlorophenoxy carbamate
sec.-butyl N-3-iodophenyl-N-bromoacetyl carbamate
isopropyl N-3-bromophenyl-N-trichloroacetyl carbamate
butyn-1'-yl-3 N-p-methoxyphenyl-N-2,3,6-trichlorobenzoyl carbamate
methyl-N-phenyl-N-β-(2,6-dibromophenyl)-acetyl carbamate
isopropyl N-diphenyl carbamate
isopropyl N-cyclohexyl-N-phenyl carbamate
isopropyl N-pyridyl-N-phenyl carbamate.

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. Compounds having adequate basicity may be used as salts in aqueous solution even after formation of the salt with acids.

Dusts may be prepared by mixing or grinding the active ingredients with a solid carrier.

The active ingredients may also be used with other herbicidal active ingredients having a selective action, e.g. ureas, acid anilides, uracils, pyridazones, halogenated phenoxycarboxylic acid derivatives and α,α-dichloroalkyl-carboxylic acids.

The following comparative experiments demonstrate the superiority of the compositions according to this invention over known active ingredients.

EXAMPLE 1

In a greenhouse plastic pots having a diameter of 8 cm. are filled with loamy, sandy soil and seeds of Indian corn (*Zea mays*), barley (*Hordeum vulgare*), wheat (*Triticum sativum*), rice (*Oryza sativa*), beet (*Beta vulgaris*), wild mustard (*Sinapis arvensis*), white goosefoot (*Chenopodium album*), small nettle (*Urtica urens*), common chickweed (*Stellaria media*), annual meadow grass (*Poa annua*) and slender foxtail (*Alopecurus myosuroides*) are sown therein. The soil thus prepared is then treated with 4 kg./ha. of methyl N-3,4-dichlorophenyl-N-hydroxy carbamate (I) and, for comparison, with 4 kg./ha. of methyl N-3,4-dichlorophenyl carbamate (II), each dispersed in 500 liters of water per hectare. Four to five weeks later it can be observed that I has a stronger herbicidal action than II. The herbicidal action can be seen from the following table.

|  | Active ingredient | |
|---|---|---|
|  | I | II |
| Crop plants: | | |
| Indian corn | 0 | 0 |
| Barley | 0–10 | 10–20 |
| Wheat | 0–10 | 20 |
| Rice | 0 | 0 |
| Beet | 10 | 30–40 |
| Unwanted plants: | | |
| Wild mustard | 90–100 | 80 |
| White goosefoot | 80 | 70 |
| Small nettle | 90–100 | 70 |
| Common chickweed | 80 | 60–70 |
| Annual meadow grass | 80 | 70 |
| Slender foxtail | 70–80 | 60 |

0 = No damage.
100 = Complete destruction.

The following have the same biological action as I in Examples 1, 2, 3 and 4:

isopropyl N-3,4-dichlorophenyl-N-hydroxy carbamate
butyn-(1)-yl-(3) N-3,4-dichlorophenyl-N-hydroxy carbamate
buten-(1)-yl-(3) N-3,4-dichlorophenyl-N-hydroxy carbamate
methyl N-3-chloro-4-methylphenyl-N-hydroxy carbamate
methyl N-4-chloro-3-methylphenyl-N-hydroxy carbamate
methyl N-3,4-dimethylphenyl-N-hydroxy carbamate
methyl N-3-methylphenyl-N-hydroxy carbamate
methyl N-3-chlorophenyl-N-hydroxy carbamate
methyl N-3-trifluoromethylphenyl-N-hydroxy carbamate.

EXAMPLE 2

In a greenhouse the plants Indian corn (*Zea mays*), barley (*Hordeum vulgare*), wheat (*Triticum sativum*), rice (*Oryza sativa*), beet (*Beta vulgaris*), wild mustard (*Sinapis arvensis*), white goosefoot (*Chenopodium album*), small nettle (*Urtica urens*), common chickweed (*Stellaria media*), annual meadow grass (*Poa annua*) and slender foxtail (*Alopecurus myosuroides*) are treated at a growth height of 3 to 15 cm. with 4 kg./ha. of methyl N-3,4-dichlorophenyl-N-hydroxy carbamate (I) and, for comparison, with 4 kg./ha. of methyl N-3,4-dichlorophenyl carbamate (II), each dispersed in 500 liters of water per hectare. Three to four weeks later it can be observed that I has a stronger herbicidal action than II. The herbicidal action can be seen from the following table.

|  | Active ingredient | |
|---|---|---|
|  | I | II |
| Crop plants: | | |
| Indian corn | 0 | 0 |
| Barley | 10 | 10–20 |
| Wheat | 0–10 | 10–20 |
| Rice | 0 | 0 |
| Beet | 10 | 20 |
| Unwanted plants: | | |
| Wild mustard | 90–100 | 90 |
| White goosefoot | 90–100 | 70–80 |
| Small nettle | 90–100 | 90 |
| Common chickweed | 90 | 60–70 |
| Annual meadow grass | 90–100 | 70–80 |
| Slender foxtail | 80–90 | 60 |

0 = No damage.
100 = Total destruction.

EXAMPLE 3

An experimental area which has been sown with wild mustard (*Sinapis arvensis*), white goosefoot (*Chenopodium album*), small nettle (*Urtica urens*), common chickweed (*Stellaria media*), annual meadow grass (*Poa annua*) and slender foxtail (*Alopecurus myosuroides*) is sprayed on the day of sowing with 7.5 kg./ha. of methyl N-3,4-dichlorophenyl-N-hydroxy carbamate (I) and, for comparison, with 7.5 kg./ha. of 2-chloro-4,6-bis-(ethylamino)-s-triazine (II), each dispersed in 500 liters of water per hectare. Three to four weeks later it is observed that active ingredient I has completely destroyed the broadleaved and grass weeds, whereas in the case of active ingredient II only some of the weeds have withered.

EXAMPLE 4

An agricultural cultivated area overgrown with wild mustard (*Sinapis arvensis*), white goosefoot (*Chenopodium album*), small nettle (*Urtica urens*), common chickweed (*Stellaria media*), annual meadow grass (*Poa annua*) and slender foxtail (*Alopecurus myosuroides*) is sprayed at a growth height of the weeds of 3 to 8 cm. with 7.5 kg./ha. of methyl N-3,4-dichlorophenyl-N-hydroxy carbamate (I) and, for comparison, with 7.5 kg./ha. of 2 - chloro - 4,6 - bis - (ethylamino) - s - triazine (II), each dispersed in 500 liters of water per hectare. Eight days later a strong herbicidal action is evident in the case of the broadleaved and grass weeds treated with I, whereas the plants sprayed with II continue to exhibit normal growth. After three weeks almost all the plants are completely withered.

We claim:
1. A compound having the formula

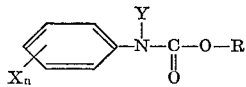

in which
X is halogen, trifluoromethyl, nitro, carboxyl, hydroxyl, methoxyl, cyano, methylsulfonyl or lower alkyl,
$n$ has the value 0 to 5,
R is an aliphatic hydrocarbon radical containing from 1 to 6 carbon atoms which may be substituted with chloro, iodo, bromo, and trifluoromethyl groups or phenyl radical which may be substituted by halogen, hydroxyl, methoxyl, cyano or carboxyl: a benzyl radical which may be substituted by a nitro group: a cycloalkyl radical or the furfuryl radical, Y is alkyl or alkyl substituted by halogen or cyano; phenyl; pyridine; cycloalkyl; or the radical —CO—$R^1$, in which $R^1$ is lower alkyl or lower alkyl substituted by halogen or phenyl, which in turn may bear halogen as substituent; or
$R^1$ is phenyl or phenyl substituted by halogen; or
Y is the radical —$OR^2$, in which
$R^2$ is hydrogen or phenyl which may be substituted by halogen or lower alkyl; or the radical —CO—$R^3$, in which
$R^3$ is alkyl which may be substituted by halogen or phenoxy, which in turn may bear chlorine or lower alkyl as substituents; or
phenyl which may be substituted by halogen; or
a pyridine radical which may be substituted by halogen or amino; or
$R^2$ is the radical

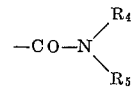

in which $R^4$ is lower alkyl or phenyl which may be substituted by halogen; and
$R^5$ is hydrogen; or
$R^5$ has the same meanings as $R^4$.
2. Methyl N - 3,4 - dichlorophenyl - N - hydroxy carbamate.

References Cited

Herrett, R. A., Chemical Abstracts (1965), vol. 63, pp. 8975 (A) relied on.

LORRAINE A. WEINBERGER, Primary Examiner

L. A. THAXTON, Assistant Examiner

U.S. Cl. X.R.

71—94, 105, 111; 260—295, 347.4, 465, 470

UNITED STATES PATENT OFFICE
CERTIFICATE OF CORRECTION

Patent No. 3,515,744     Dated June 2, 1970

Inventor(s) Gustav Steinbrunn et al

It is certified that error appears in the above-identified patent and that said Letters Patent are hereby corrected as shown below:

Column 1, line 20, "denate" should read -- denote --; line 29, "know" should read -- known --; line 66, "radical, in which" should read -- radical, --; line 71, "$R^4$" should read -- in which $R^4$ --.

Column 2, line 64, "carbonate" should read -- carbamate --; delete lines 69 and 70.

SIGNED AND
SEALED
OCT 6 - 1970

(SEAL)
Attest:

Edward M. Fletcher, Jr
Attesting Officer

WILLIAM E. SCHUYLER, JR.
Commissioner of Patents